(12) United States Patent
Chan

(10) Patent No.: US 6,370,338 B1
(45) Date of Patent: Apr. 9, 2002

(54) FILM PRE-EXPOSURE APPARATUS AND METHOD

(75) Inventor: Priscilla Ti Ti Chan, Kowloon (HK)

(73) Assignee: Foster Assets Corporation (HK)

( * ) Notice: Subject to any disclaimer, the term of this patent is extended or adjusted under 35 U.S.C. 154(b) by 0 days.

(21) Appl. No.: 09/452,587

(22) Filed: Dec. 1, 1999

Related U.S. Application Data

(63) Continuation-in-part of application No. 09/092,607, filed on Jun. 5, 1998.

(51) Int. Cl.[7] .............................................. G03B 41/00
(52) U.S. Cl. ........................ 396/322; 355/40; 396/335
(58) Field of Search ........................... 355/40, 41, 77, 355/29, 71, 72; 396/154, 322, 310, 315, 323, 335, 419

(56) References Cited

U.S. PATENT DOCUMENTS

| | | | |
|---|---|---|---|
| 4,536,848 A | 8/1985 | d'Entremont et al. | 700/112 |
| 5,307,108 A | 4/1994 | Yamanouchi et al. | 396/661 |
| 5,765,062 A * | 6/1998 | Dobbs et al. | 396/322 |

FOREIGN PATENT DOCUMENTS

| | | |
|---|---|---|
| EP | 692738 | 1/1996 |
| EP | 766128 | 4/1997 |

* cited by examiner

*Primary Examiner*—D Rutledge
(74) *Attorney, Agent, or Firm*—Samuels, Gauthier & Stevens

(57) ABSTRACT

An apparatus (100) for pre-exposing a camera film with images has a microprocessor-based control unit having a storage device (300, 316) for storing said images, an image generator such as a cathode ray tube (110) or graphics display (301) controlled by the control unit to produce an image for pre-exposing the film with said images, and a lens (130, 306) for focusing the image onto the film for said image pre-exposure.

23 Claims, 4 Drawing Sheets

FILM PRE-EXPOSURE APPARATUS AND METHOD

This application is a C-I-P of Ser. No. 09/092,607 filed Jun. 5, 1998.

The present invention relates to an apparatus for and a method of pre-exposing camera film with images.

BACKGROUND OF THE INVENTION

Cameras designed to use a roll of film which is pre-exposed with images such as greeting messages and decorative borders on respective normal exposure frames, are known. Conventionally, the pre-exposure of such images is carried out by actually taking photographs of hard copies of the images on the relevant parts of the respective frames, with the remaining parts of the frames unexposed for subsequent normal photograph taking. This pre-exposure method is found to be not only time consuming but also inflexible in terms of the combination and/or order of the images to be pre-exposed on the film rolls.

The invention seeks to mitigate and/or at least alleviate such problems by providing a new apparatus for and a new method of pre-exposing camera film with images.

SUMMARY OF THE INVENTION

According to the invention, there is provided an apparatus for pre-exposing a length of photographic film with a series of latent images for subsequent use in a camera, comprising a control unit having a storage device for storing said images, image generating means for producing an optical image from said storage device, film housing means for housing a length of film between a film supply means and film take-up means, film advance means for advancing the film between the film supply and take-up means, and a lens for, in use, focusing the image onto the photographic film.

In one embodiment, the image generating means is a cathode ray tube controlled by the control unit to produce a scanning light beam. A color filter may be provided between the cathode ray tube and the lens for changing the color of the light beam. More preferably, the filter is provided by a filter wheel which incorporates a plurality of filters of different colors for selective use. It is preferred that the filter wheel is automatically rotatable under the control of the control unit.

In this embodiment, a first support is provided for supporting a film supply means holding a roll of the film, a second support is provided for supporting a film take-up means to receive the film fed from the film supply means, and the cathode ray tube and the lens are provided at an intermediate position between the two supports for pre-exposing the film in transit. It is preferred that the apparatus includes another support which is provided at the same intermediate position for supporting the film in transit for pre-exposure.

It is preferred that the apparatus includes an enclosure providing a light-tight environment for housing the cathode ray tube and the lens as well as the film supply and take-up means. More preferably, the enclosure has a central chamber for housing the cathode ray tube and the lens and opposite side chambers for housing the respective film supply and take-up means.

Advantageously, the apparatus is adapted to pre-expose a bulk roll of film for subsequently cutting into a plurality of shorter film roll strips for individual use in a camera.

The apparatus may include a sensor arranged to detect a pre-punched hole of the film for determining the position of the film.

The image generating means may alternatively comprise the display screen of a computer terminal, which include a cathode ray tube or may be liquid crystal display screen. In this embodiment the film may be housed in a photo-taking device having an exposure opening closed by a shutter means. A light-tight hood may here be arranged between the screen and photo-taking device.

In a further aspect the invention resides in a method of pre-exposing with a series of latent images a length of photographic film for subsequent use with in a camera in an apparatus which has a control unit having a storage device in which an image or a plurality of images are stored and an image generating means to produce an optical image from said storage device, the method involving retrieving a first stored image and generating this on said image generating means, and focusing with a lens said optical image onto a portion of said photographic film for a predetermined period, retrieving a second stored image and generating this on said image generating means, and focusing with a lens said second optical image onto a different portion of said photographic film.

Preferably, the method further comprises the steps of sequentially retrieving a plurality of stored images, generating these on the image generating means and focusing these sequentially onto the length of photographic film. The second and subsequent images may be different or the same as the said first image.

The method may include using an image generator in the form of a cathode ray tube to produce a scanning light beam which is focused on the film in which case a color filter may be used between the cathode ray tube and the lens for changing the color of the light beam. The method may include the step of providing a first support for supporting a film supply means holding a roll of the film, providing a second support for supporting a film take-up means to receive the film fed from the film supply means, and placing the cathode ray tube and the lens at an intermediate position between the two supports for pre-exposing the film in transit. More preferably, the method includes the step of providing another support at the same intermediate position for supporting the film in transit for pre-exposure.

In a preferred embodiment, the method is adapted to pre-expose a bulk roll of film, and includes the step of subsequently cutting the pre-exposed film into a plurality of shorter film roll strips for individual use in a camera.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
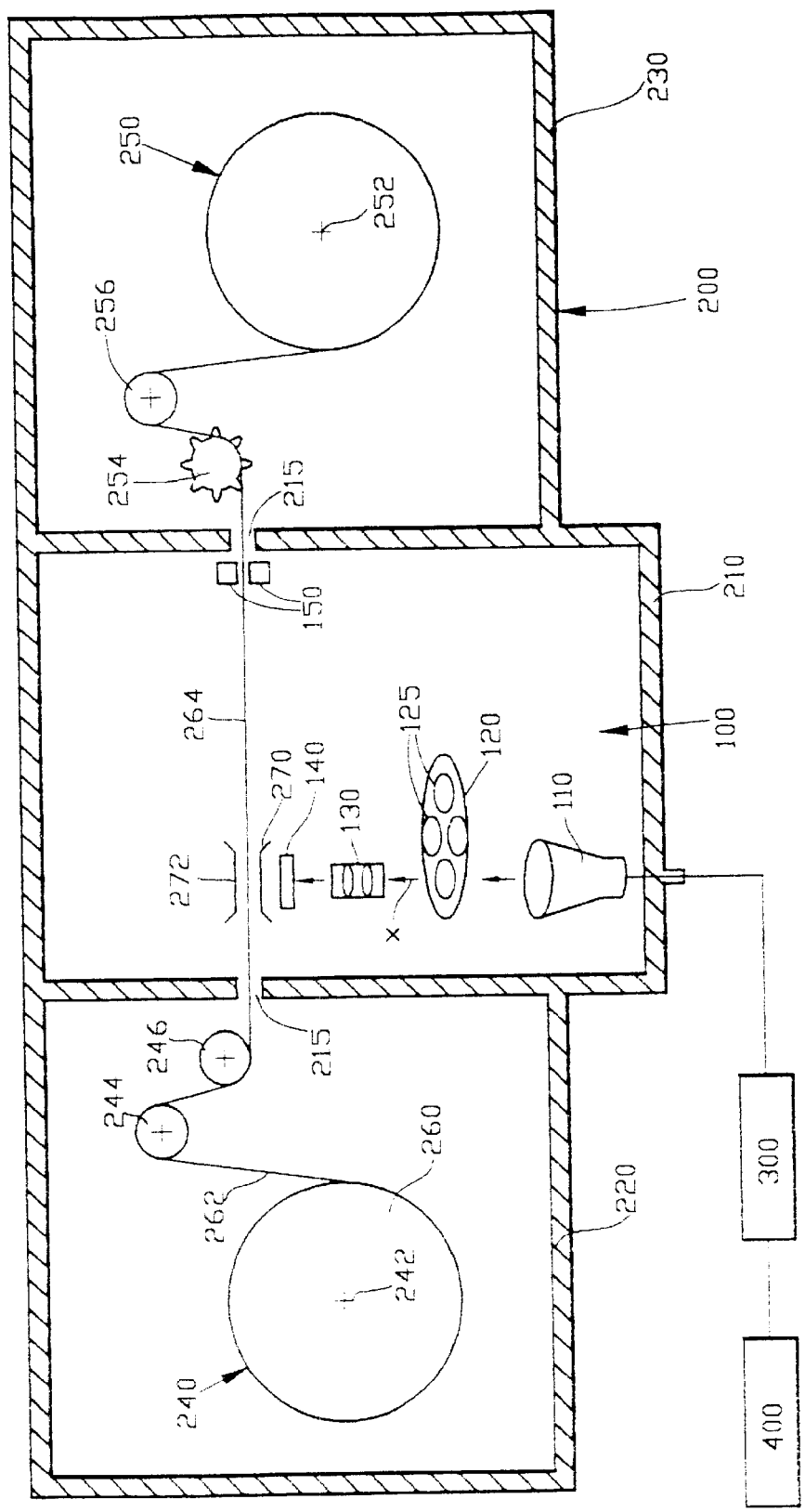
FIG. 1 is a schematic diagram showing an embodiment of a film pre-exposure apparatus in accordance with the invention.

Referring firstly to FIG. 1 of the drawings, there is shown a film pre-exposure apparatus 100 embodying the invention, which apparatus 100 is to operate in an absolute dark environment such as one provided by a light-tight enclosure 200 having non-reflective inner wall surfaces. The enclosure 200 may be considered as part of the overall apparatus 100. It has a central chamber 210 in which the apparatus 100 is set up, a left chamber 220 housing a film feed reel 240 supported on a first axle 242 and a pair of guide rollers 244, and a right chamber 230 housing a film take-up reel 250 supported on a second axle 252 and another pair of guide rollers 254. Left and right side walls of the central chamber 210 are formed with mutually aligned horizontal slots 215. The feed reel 240 holds a bulk roll 260 of camera film 262 for feeding onto the take-up reel 250 via the rollers 244 and 254. Section 264 of the film 262 in transit extends straight across the central chamber 210 through the slots 215 on opposite sides.

The film 262 is pre-punched with spindle holes (not shown) which define individual film strips to be cut out from the bulk film roll 260 later for forming into pre-exposed film rolls of a standard length to provide, for example, 24 or 36 normal exposure frames for use in a camera.

Inside the central chamber 210, a horizontal platform 270 is provided at an intermediate position to support the film section 264. Also, a notch sensor 140 is fitted adjacent the right hand side slot 215 for detecting the pre-punched spindle holes of the film 262 in order to determine the film position and in particular the start of the each film roll strip.

The apparatus 100 is formed by an upper cathode ray tube 110 facing downwards, an intermediate filter wheel 120 and a lower lens assembly 130. The cathode ray tube 110 and lens assembly 130 having a common vertical axis X which passes through the center of the platform 270 further below. The cathode ray tube 110 serves to generate a narrow beam of light pointing downwards. The filter wheel 120 incorporates a ring of four filters 125 of different colors for changing the color of the light beam. The lens assembly 130 is used to focus the light beam onto the film section 264 supported on the platform 270.

The operation of the apparatus 100 is controlled by means of a microprocessor-based control unit such as a computer 300, to which a scanner 400 is connected. Hard copies of the images to be pre-exposed onto the film 262 are initially scanned by the scanner 400 into the computer 300 and stored in a suitable storage device, such as the hard disk, of the computer 300. Alternatively, the images may be computer-generated and stored on the hard disk or a floppy disk.

Figure 2:
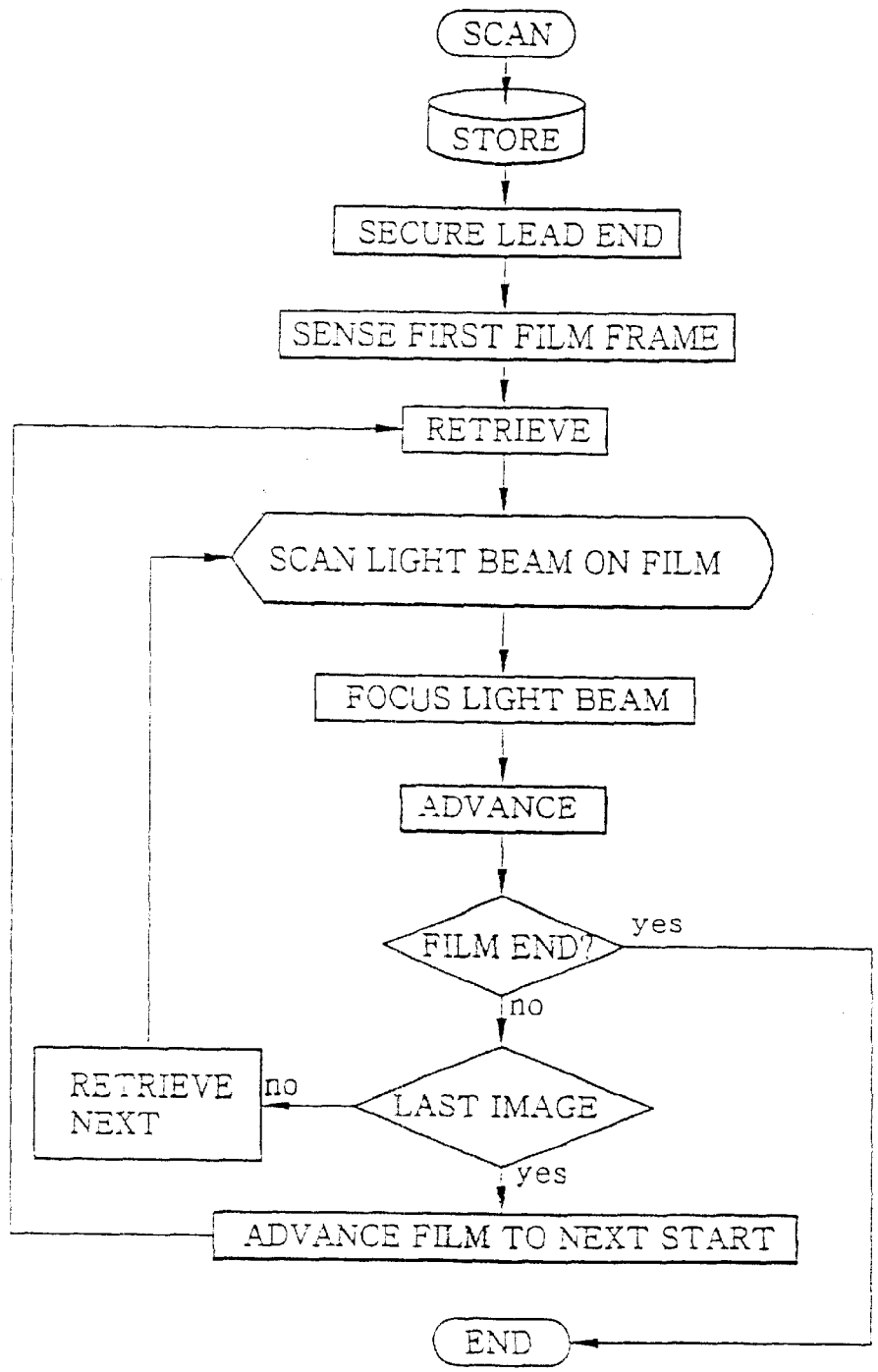
FIG. 2 is a flow chart illustrating a film pre-exposure method, embodying the invention, carried out by the mechanism of FIG. 1.

FIG. 2 explains the operation of the apparatus 100 for pre-exposing the film 262, as an example according to the subject invention. Initially (SCAN), the scanned and/or computer-generated images are stored in the computer 300 (STORE) . After having been loaded onto the feed reel 240 and having the film lead end fed past the rollers 244 and 254 to the take-up reel 250 (SECURE LEAD END), the bulk film roll 260 is advanced until the first pre-punched spindle hole of the film 262 is sensed by the sensor 140 (SENSE FIRST FILM FRAME). At this time, the first frame of the film 262, which is also the first exposure frame of the first film roll strip, should align centrally with the axis X on the platform 270. The computer 300 then retrieves the first stored image (RETRIEVE) and displays it on the cathode ray tube 110 in the form of a scanning light beam which results in a travelling spot of light scanning the entire or part of the tube screen depending on the size of the image (SCAN LIGHT BEAM ON FILM).

Simultaneously, after passing through one of the color filters 125 selected through rotation of the filter wheel 120 either manually or preferably automatically under the control of the computer 300, the scanning light beam is focused by the lens assembly 130 onto the frame for pre-exposing it with the image (FOCUS LIGHT BEAM). The intensity of the light beam generated by the cathode ray tube 110 changes according to the image for reproducing it onto the frame. One scanning operation will normally be sufficient for reproducing a mono-chromatic image using one of the color filters 125 of the filter wheel 120. Several scanning operations, using different color filters 125, will be needed for reproducing a multi-color image or an image having one or more colors which can only be mixed by using a combination of the color filters 125.

Upon completion of the first image pre-exposure, the film 262 is advanced for one frame in order to place the next frame centrally on the platform 270 (ADVANCE). A checking step will now be taken to see whether the bulk film roll 260 has come to an end (FILM END?). If so, the operation will terminate (END), otherwise another step will be taken to check whether the last image for the current film roll strip has just been processed (LAST IMAGE?). In the affirmative, the bulk film roll 260 will be advanced until the next pre-punched spindle hold is sensed by the sensor 140 (ADVANCE FILM TO NEXT START). Subsequently, the computer 300 will retrieve the first stored image for the next film roll strip (RETRIEVE) and the aforesaid procedures will be repeated. If the current film roll strip has not yet been finished, the computer 300 will retrieve the next stored image (RETRIEVE NEXT) for the cathode ray tube 110 to scan (SCAN LIGHT BEAM ON FILM) and the aforesaid procedures will be repeated.

Figure 3:
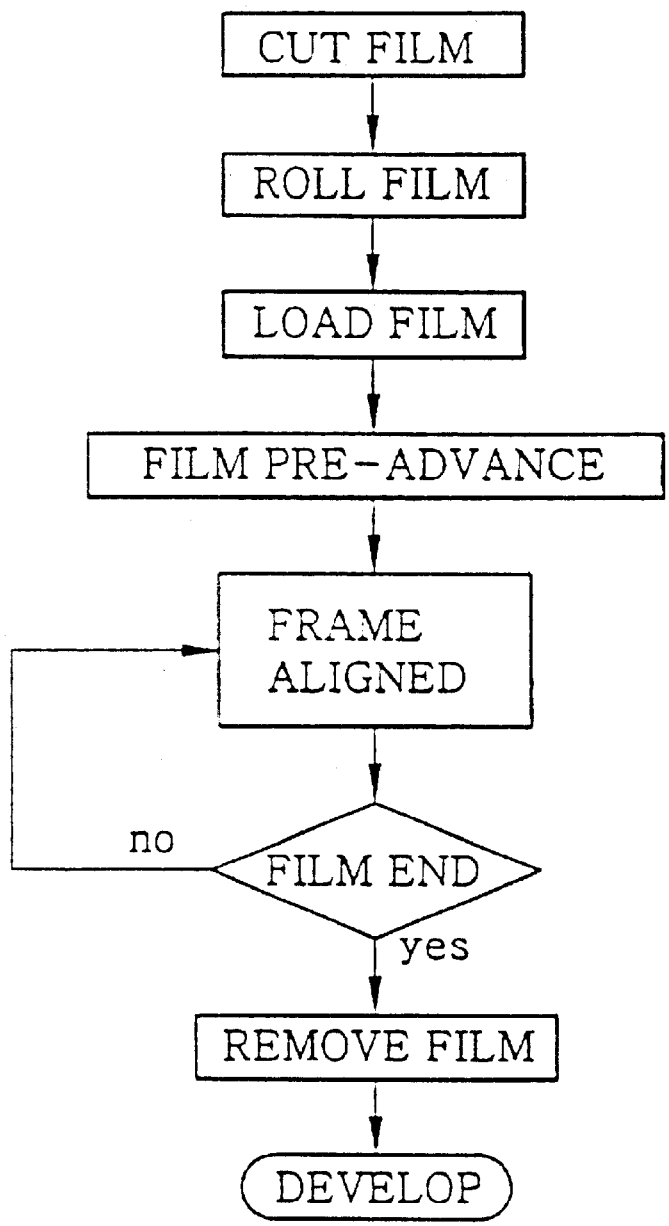
FIG. 3 is a flow chart illustrating the subsequent procedures of using the pre-exposed film produced.

Reference is next made to FIG. 3, which illustrates the subsequent procedures of using the pre-exposed film 262 produced. Initially, the film 262 is cut into film strips at positions according to the respective pre-punched spindle holes (CUT FILM). Each film strip is then rolled into a standard 35 mm film cartridge to form a film roll (ROLL FILM). The film roll is afterwards loaded into a camera, which may be a single-use or reusable camera (LOAD FILM) , and then pre-advanced to the last frame of the film roll (FILM PRE-ADVANCE). The camera is now ready for use from the last frame backwards. The film is pre-advanced such that the last frame is positioned for the first actual photograph to be taken on the same frame (FRAME ALIGN) and in alignment with the pre-exposed image. A first photograph is taken by the user, after which the film is wound on. The next and subsequent frames are then exposed one-by-one until all of them are exposed. If the film end is not reached (FILM END?) the film continues to be advanced and aligned. At the end, the film roll is removed (REMOVE FILM) from the camera for film development (DEVELOP) and print making in the conventional manner.

The use of the aforesaid computer operated cathode ray tube to produce pre-exposed film is highly flexible, in that a different combination and/or order of the pre-exposure images may be used for each film roll strip as desired. The pre-exposure of a whole bulk film roll in a single operation, rather than the film roll strips individually, will also considerably increase the speed of production.

Figure 4:
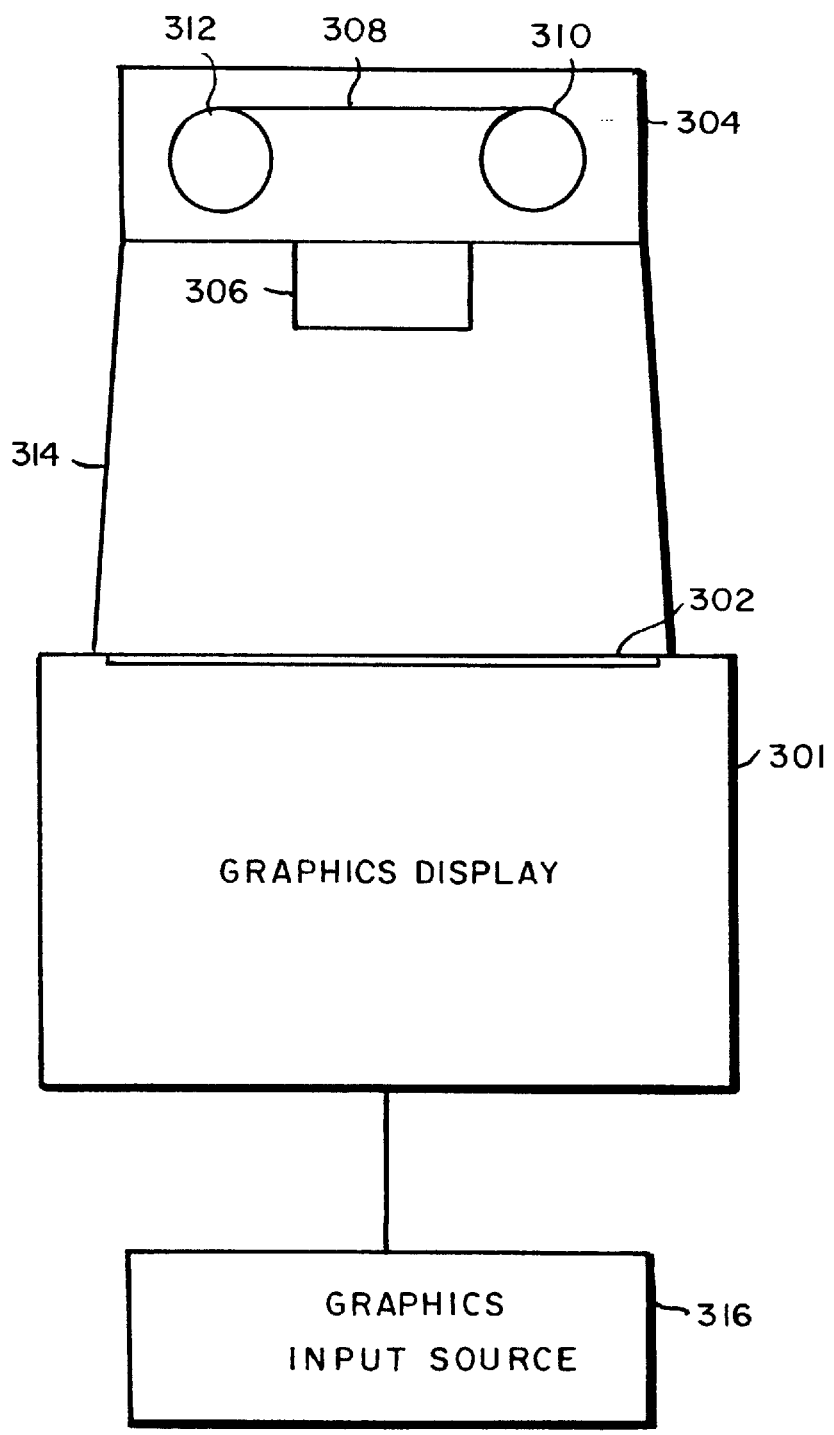
FIG. 4 is a schematic diagram showing an alternative embodiment of a film pre-exposure apparatus.

In an alternative embodiment illustrated in FIG. 4 instead of using a scanning cathode ray tube to project the image onto the film, the image is displayed on a graphics display 301 having a screen 302. This graphics display 301 may be a computer monitor or video monitor of conventional type, either utilizing a cathode ray tube therein or of liquid crystal display type. Alternatively, other display screen types may be employed.

Facing the screen 302 is a photo-taking device 304 having a light-tight film housing and an exposure aperture facing the screens 302, with a lens 306 arranged therebetween. The photo-taking device is provided with a shutter allowing the film to be exposed to the image on the screen 302 for a predetermined period of time. Within the film housing the film 308 which is to be pre-exposed extends between a film supply spool 310 and take-up spool 312. Appropriate means are provided to advance the film by a single frame after each exposure. Between the photo-taking device 304 and the screen 302 there is arranged a light-tight hood 314. The photo-taking device 304 is preferably specifically constructed for use in this environment, but it also possible to utilize a conventional camera having appropriate adaptation to allow connection to the hood 314. Alternatively, the apparatus may be used in a light-tight environment, in which case the hood 314 is not required.

The images to be displayed on the graphics display 301 are stored in a graphics input source 316 which may be a compact disc or video disc player where the images are recorded digitally in optical disk form, but may also be a computer or central processing unit for reading images stored on a floppy disc or hard drive or magnetic tape.

Preferably a computer or processor is provided to control the operation of the photo-taking device 304 in terms of film exposure and film advance, to allow the selection of images from the graphics input source 316 and their display on the graphics display 301. Such computer or processor control allows the rapid selection of different images and the rapid film advance after each exposure in order to allow an entire roll of film or a bulk roll of film to be exposed rapidly which is important in the exposure of large quantities of film.

The invention has been given by way of example only, and various modification of and/or alterations to the described embodiment may be made by persons skilled in the art without departing from the scope of the invention as specified in the appended claims.

What is claimed is:

1. An apparatus for pre-exposing a length of photographic film with a series of images in latent form for subsequent use in a camera, comprising a control unit having a storage device for storing data representative of said images, image generating means for producing an optical image from said stored data in said storage device, film housing means for housing a length of film between a film supply means and film take-up means, film advance means for advancing the film between the film supply and the take-up means, and a lens for, in use, focusing the image onto the photographic film.

2. An apparatus according to claim 1 wherein the image generating means is a cathode ray tube controlled by the control unit to produce a scanning light beam.

3. An apparatus as claimed in claim 2, including a color filter provided between the cathode ray tube and the lens for changing the color of the light beam.

4. An apparatus as claimed in claim 3, wherein the filter is provided by a filter wheel which incorporates a plurality of different colors for selective use.

5. An apparatus as claimed in claim 4, wherein the filter wheel is automatically rotatable under the control of the control unit.

6. An apparatus as claimed in claim 2, wherein a first support is provided for supporting the film supply means for holding a roll of the film, a second support is provided for supporting the film take-up means to receive the film fed from the film supply means, and the cathode ray tube and the lens are provided at an intermediate position between the tow supports for pre-exposing the film in transit.

7. An apparatus as claimed in claim 6, including a further support which is also provided between the said two supports for supporting the film in transit for pre-exposure.

8. An apparatus as claimed in claim 6, including an enclosure providing a light-tight environment for housing the cathode ray tube and the lens as well as the film supply and take-up means.

9. An apparatus as claimed in claim 8, wherein the enclosure has a central chamber for housing the cathode ray tube and the lens and opposite side chambers for housing the respective film supply and take-up means.

10. An apparatus as claimed in claim 2, being adapted to pre-expose a bulk roll of film for subsequently cutting into a plurality of shorter film roll strips for individual use in a camera.

11. An apparatus as claimed in claim 1, including a sensor arranged to detect a pre-punched hole of the film for detecting the position of the film.

12. An apparatus according to claim 1 wherein the image generating means comprises the display screen of a computer terminal.

13. An apparatus according to claim 1 wherein the image generating means comprises a liquid crystal display screen.

14. An apparatus according to claim 1 wherein the film is housed in a photo-taking device having an exposure aperture closed by shutter means.

15. An apparatus according to claim 14 wherein a light-tight hood is arranged between the image generating means and the photo-taking device.

16. A method of pre-exposing with a series of latent images a length of photographic film for subsequent use with in a camera in an apparatus which has a control unit having a storage device in which data representative of an image or a plurality of images are stored and an image generating means to produce an optical image from said stored data in said storage device, the method involving retrieving a first stored image and generating this image on said image generating means, and focusing with a lens said optical image onto a portion of said photographic film for a predetermined period, retrieving a second stored image an generating this on said image generating means, and focusing with a lens said second optical image onto a different portion of said photographic film.

17. A method according to claim 16 further comprising the steps of sequentially retrieving a plurality of stored images, generating these images on the image generating means and focusing these images sequentially onto the length of photographic film.

18. A method according to claim 16 wherein the second image is different to the first image.

19. A method according to claim 16 wherein the second image is the same as the first image.

20. A method as claimed in claim 16, utilizing image generating means in the form of a cathode ray tube to produce a scanning light beam, including the step of providing a color filter between the cathode ray tube and the lens for changing the color of the light beam.

21. A method as claimed in claim 20, including the steps of providing a first support for supporting a film supply means holding a roll of the film, providing a second support for supporting a film take-up means to receive the film fed from the film supply means, and placing the cathode ray tube and the lens at an intermediate position between the two supports for pre-exposing the film in transit.

22. A method as claimed in claim 21, including the step of providing another support between the said two supports for supporting the film in transit for pre-exposure.

23. A method as claimed in claim 16, being adapted to pre-expose a bulk roll of film and including the step of subsequently cutting the pre-exposed film into a plurality of shorter film roll strips for individual use in a camera.

* * * * *